(12) United States Patent
Luo et al.

(10) Patent No.: US 8,375,564 B1
(45) Date of Patent: Feb. 19, 2013

(54) METHOD FOR FABRICATING A POLE OF A MAGNETIC TRANSDUCER

(75) Inventors: Guanghong Luo, Fremont, CA (US); Danning Yang, Fremont, CA (US); Weimin Si, Pleasanton, CA (US); Dujiang Wan, Fremont, CA (US); Yun-Fei Li, Fremont, CA (US); Lijie Guan, San Jose, CA (US); Ming Jiang, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 239 days.

(21) Appl. No.: 12/633,562

(22) Filed: Dec. 8, 2009

(51) Int. Cl.
*G11B 5/127* (2006.01)
*H04R 31/00* (2006.01)

(52) U.S. Cl. ............... 29/603.16; 29/603.13; 29/603.14; 29/603.15; 29/603.18; 216/62; 216/66; 216/67; 360/121; 360/122; 360/317; 451/5; 451/41

(58) Field of Classification Search ............... 29/603.11, 29/603.13–603.16, 603.18; 216/62, 66, 67; 360/121, 122, 317; 451/5, 41
See application file for complete search history.

(56) References Cited

U.S. PATENT DOCUMENTS

| | | | |
|---|---|---|---|
| 5,540,346 A * | 7/1996 | Fujimoto et al. ............... 216/24 |
| 7,159,302 B2 | 1/2007 | Feldbaum et al. |
| 7,367,112 B2 | 5/2008 | Nix et al. |
| 7,430,095 B2 | 9/2008 | Benakli et al. |
| 7,444,740 B1 | 11/2008 | Chung et al. |
| 7,464,457 B2 | 12/2008 | Le et al. |
| 7,506,431 B2 | 3/2009 | Hsiao et al. |
| 7,549,213 B2 | 6/2009 | Hsu et al. |
| 7,565,732 B2 | 7/2009 | Le et al. |
| 7,576,951 B2 | 8/2009 | Allen et al. |
| 7,979,978 B2 * | 7/2011 | Han et al. .................... 29/603.15 |
| 8,077,434 B1 | 12/2011 | Shen et al. |
| 8,166,631 B1 | 5/2012 | Tran et al. |
| 2005/0237665 A1 | 10/2005 | Guan et al. |
| 2006/0044681 A1 | 3/2006 | Le et al. |
| 2006/0044682 A1 | 3/2006 | Le et al. |
| 2006/0225268 A1 | 10/2006 | Le et al. |
| 2006/0288565 A1 | 12/2006 | Le et al. |
| 2007/0115584 A1 | 5/2007 | Balamane et al. |
| 2007/0177301 A1 | 8/2007 | Han et al. |
| 2008/0026254 A1 | 1/2008 | Hsiao et al. |
| 2008/0100959 A1 | 5/2008 | Feldbaum et al. |
| 2008/0110761 A1 | 5/2008 | Lam et al. |
| 2008/0113090 A1 | 5/2008 | Lam et al. |
| 2008/0151437 A1 | 6/2008 | Chen et al. |
| 2008/0253035 A1 | 10/2008 | Han et al. |
| 2008/0273276 A1 | 11/2008 | Guan |
| 2008/0273277 A1 | 11/2008 | Guan et al. |
| 2008/0278861 A1 | 11/2008 | Jiang et al. |
| 2008/0297945 A1 | 12/2008 | Han et al. |
| 2009/0002885 A1 | 1/2009 | Sin |

(Continued)

*Primary Examiner* — Paul D Kim

(57) ABSTRACT

A method provides a pole of magnetic recording transducer. A nonmagnetic stop layer having a thickness and a top surface is provided. A depression that forms a bevel is provided in the stop layer. The bevel has a depth less than the thickness and a bevel angle with respect to a remaining portion of the top surface. The bevel angle is greater than zero and less than ninety degrees. An intermediate layer having a substantially flat top surface is provided over the stop layer. A trench is formed in the intermediate layer via a removal process. The trench has a profile corresponding to the pole. The stop layer is a stop for the removal process. The method also includes providing the pole in the trench. The pole has a leading edge bevel corresponding to the bevel in the stop layer.

19 Claims, 11 Drawing Sheets

U.S. PATENT DOCUMENTS

| | | |
|---|---|---|
| 2009/0116145 A1 | 5/2009 | Guan et al. |
| 2009/0128952 A1 | 5/2009 | Sato et al. |
| 2009/0168242 A1 | 7/2009 | Liu |
| 2009/0184091 A1 | 7/2009 | Zheng |
| 2009/0195920 A1 | 8/2009 | Bonhote et al. |
| 2010/0061016 A1 | 3/2010 | Han et al. |
| 2010/0062177 A1 | 3/2010 | Jiang et al. |
| 2010/0112486 A1* | 5/2010 | Zhang et al. .......... 430/314 |
| 2011/0094888 A1 | 4/2011 | Chen et al. |

\* cited by examiner

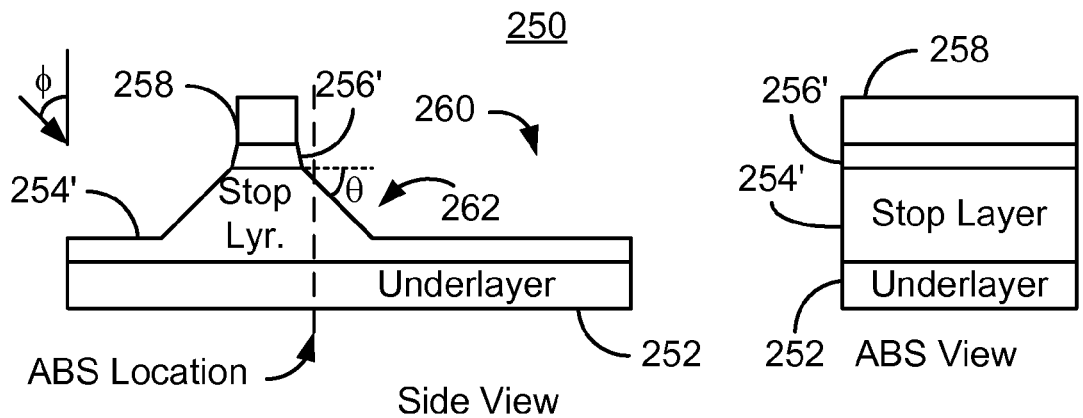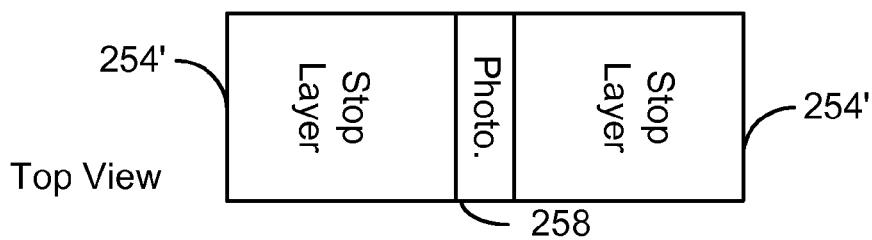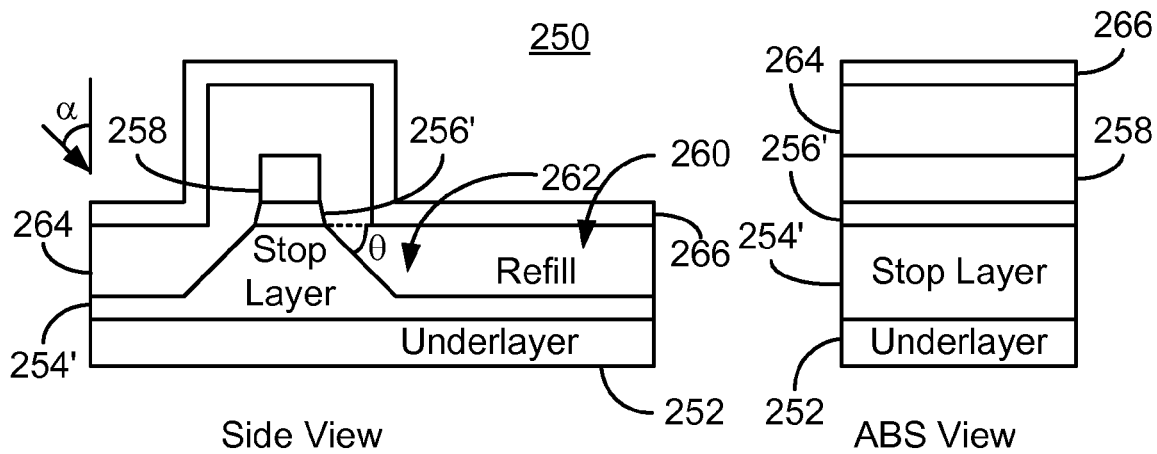

METHOD FOR FABRICATING A POLE OF A MAGNETIC TRANSDUCER

BACKGROUND

FIG. 1 is a flow chart depicting a conventional method 10 for fabricating a conventional perpendicular magnetic recording (PMR) transducer. For simplicity, some steps are omitted. The conventional method 10 is used for providing a PMR pole. An intermediate layer is provided, via step 12. The intermediate layer is typically aluminum oxide. A mask is provided on the aluminum oxide layer, via step 14. The mask may be a hard mask patterned using a photoresist mask. The mask includes an aperture above the portion of the aluminum oxide layer in which the PMR pole is to be formed. Using the mask, a trench is formed in the aluminum oxide layer, via step 16. The top of the trench is wider than the trench bottom. In addition, the trench may extend through the aluminum oxide layer to the underlayer. As a result, the PMR pole formed therein will have its top surface wider than its bottom. Consequently, the sidewalls of the PMR pole have a reverse angle. The conventional PMR pole materials are deposited, via step 18. Step 18 may include plating or sputtering ferromagnetic pole materials as well as seed layer(s). A CMP is then performed, via step 20. A top, or trailing edge, bevel may be formed in the pole, via step 22. Step 22 typically includes removing a portion of the remaining pole materials proximate to the air-bearing surface (ABS) location. The ABS location is the location at which the ABS will reside in the completed structure. Subsequent structures, such as a write gap and shields, may also be fabricated.

FIG. 2 depicts a portion of a conventional PMR transducer 50 formed using the conventional method 10. The conventional transducer 50 includes an underlayer 52, aluminum oxide layer 54 in which the trench for the pole 56 is formed. The pole 56 is shown as including trailing bevel 58. Thus, using the conventional method 10, a pole 56 having a trailing edge bevel may be formed in an aluminum oxide layer 54.

Although the conventional method 10 may provide the conventional PMR transducer 50, there may be drawbacks. In particular, writability is desired to be improved beyond that which the method 10 and the trailing bevel 58 may provide. For example, improved reverse overwrite and signal to noise ratio might be desired to be achieved. As a result, the shape of the pole 56 and distribution of the magnetic flux from the pole 56 may be desired to be changed. Accordingly, what is needed is an improved method for fabricating a PMR transducer.

SUMMARY

A method and system for providing a pole of magnetic recording transducer are described. The method and system include providing a nonmagnetic stop layer having a thickness and a top surface. The method and system also include removing a portion of the stop layer to form a depression therein. The depression forms a bevel in the stop layer. The bevel has a depth less than the thickness of the stop layer and a bevel angle with respect to a remaining portion of the top surface. The bevel angle is greater than zero degrees and less than ninety degrees. The method and system also include providing an intermediate layer over the stop layer. The intermediate layer has a substantially flat top surface. A portion of the intermediate layer is removed via a removal process to form a trench therein. The trench has a profile corresponding to the pole. The stop layer is a stop for the removal process. The method and system also include providing the pole in the trench. The pole has a leading edge bevel corresponding to the bevel in the stop layer.

BRIEF DESCRIPTION OF SEVERAL VIEWS OF THE DRAWINGS

FIGS. 6-20 are diagrams depicting an exemplary embodiment of a perpendicular magnetic recording transducer during fabrication.

DETAILED DESCRIPTION OF THE PREFERRED EMBODIMENTS

Figure 1:
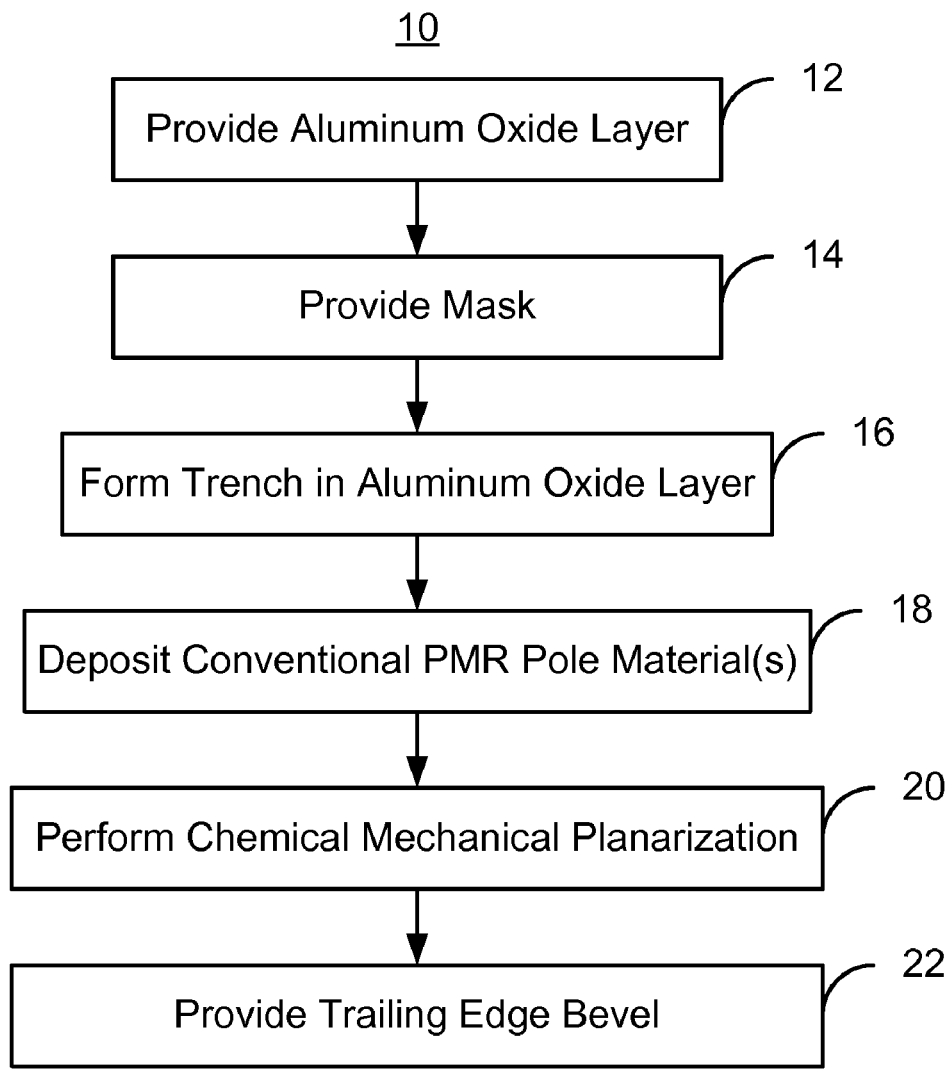
FIG. 1 is a flow chart depicting a conventional method for fabricating a PMR transducer.
Figure 2:
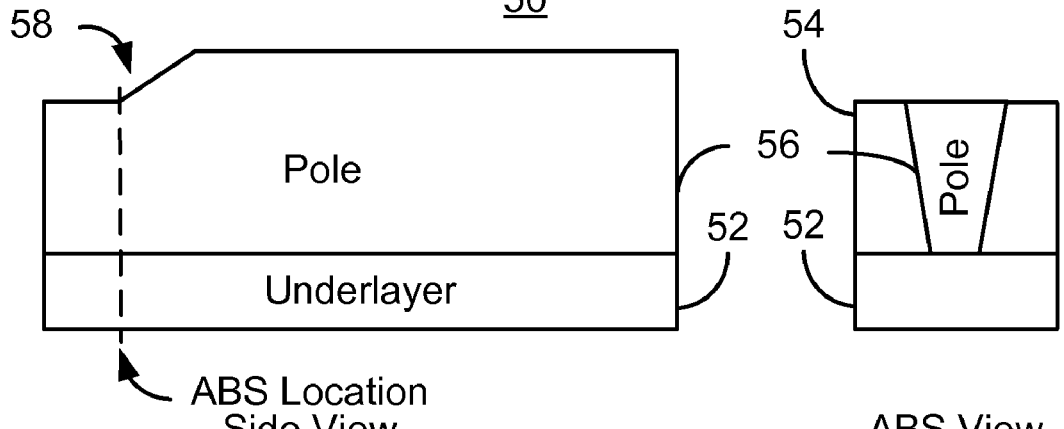
FIG. 2 is a diagram depicting a conventional PMR transducer.
Figure 3:
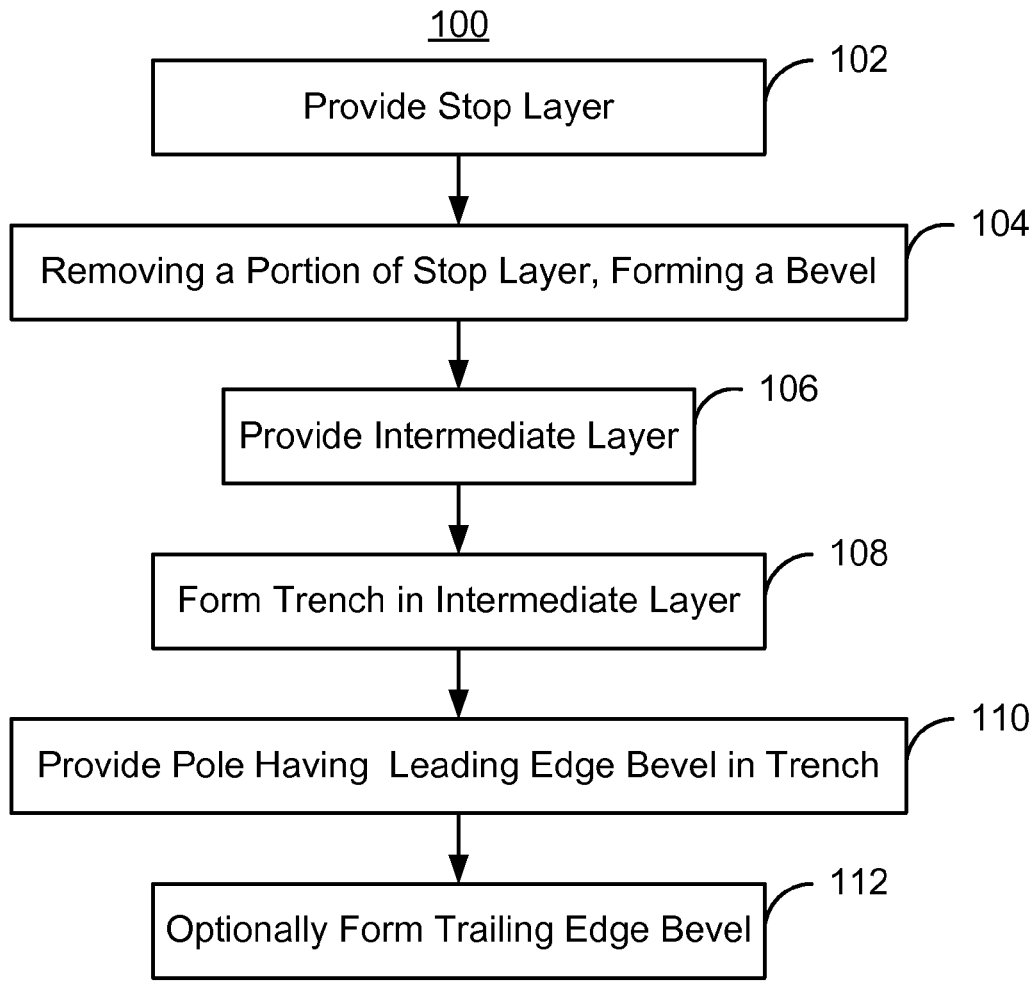
FIG. 3 is a flow chart depicting an exemplary embodiment of a method for fabricating a PMR transducer.

FIG. 3 is a flow chart depicting an exemplary embodiment of a method 100 for fabricating a transducer. The method 100 is described in the context of a PMR transducer, though other transducers might be so fabricated. For simplicity, some steps may be omitted and/or combined. The PMR transducer being fabricated may be part of a merged head that also includes a read head (not shown) and resides on a slider (not shown) in a disk drive. The method 100 also may commence after formation of other portions of the PMR transducer. The method 100 is also described in the context of providing a single PMR pole and its associated structures in a single magnetic recording transducer. However, the method 100 may be used to fabricate multiple transducers at substantially the same time. The method 100 and system are also described in the context of particular layers. However, in some embodiments, such layers may include multiple sub-layers. In one embodiment, the method 100 commences after formation of the underlayer(s) on which the PMR pole is to reside.

A stop layer is provided, via step 102. The stop layer is nonmagnetic has a thickness and a top surface. The stop layer may include one or more of Ru, Cr, NiCr, and a NiFe/Ru bilayer. In some embodiments, the stop layer is at least 1200 Angstroms. In other embodiments, the stop layer may be at least 1400 Angstroms and not more than 1600 Angstroms.

A portion of the stop layer is removed to form a depression therein, via step 104. The depression forms a bevel in the stop layer. The bevel has a depth less than the thickness of the stop layer. The bevel also has a bevel angle with respect to a remaining portion of the top surface of the stop layer. The bevel angle is greater than zero degrees and less than ninety degrees. For example, in some embodiments, the bevel angle may be at least twenty degrees and not more than forty degrees. Step 104 may include masking a portion of the stop layer proximate to the ABS location, then removing the exposed portion of the stop layer. In some embodiments, the portion of the stop layer is removed using an ion mill performed at a mill angle from normal to the top surface of the stop layer. The milling angle used corresponds to the bevel angle. In some embodiments, the milling angle is greater than the bevel angle.

An intermediate layer is provided over the stop layer, via step 106. The intermediate layer has a substantially flat top surface and fills the depression. In some embodiments, the intermediate layer includes alumina. Also in some embodiments, step 106 includes providing a first layer that refills the depression. This first layer may be deposited using an angled ion beam deposition process that may control the profile of the first layer. The top of the first layer is thus coplanar with the top surface of a remaining portion of the stop layer outside of the bevel. A second layer is then provided on the first layer. The second layer may reside on the flat surface formed by part of the stop layer and the first layer. The first and second layers together form the intermediate layer with a flat top surface. In some embodiments, the first and second layers are formed of the same material. However in other embodiments, the first and second layers may include different materials.

A portion of the intermediate layer is removed via a removal process, in step 108. A trench is thus formed in the intermediate layer. The trench has a profile and a location that correspond to the pole being formed. Thus, the trench may have a top wider than its bottom and is located where the pole is to be formed. The stop layer provided in step 102 is a stop for the removal process in step 108. For example, an alumina reactive ion etch (RIE) may be performed in step 108 to form the trench. In such embodiments, the stop layer deposited in step 102 may be a Ru layer. Thus, a portion of the stop layer may form the bottom of the trench. As a result, the trench bottom may incorporate the bevel.

The pole is provided in the trench, via step 110. Because the bottom of the trench may be formed by the stop layer, the pole has a leading edge bevel corresponding to the bevel in the stop layer.

A trailing edge bevel may be optionally formed in the pole, via step 112. For example, step 112 may include masking a portion of the pole distal from an air-bearing surface location and milling an exposed portion of the pole.

Figure 4:
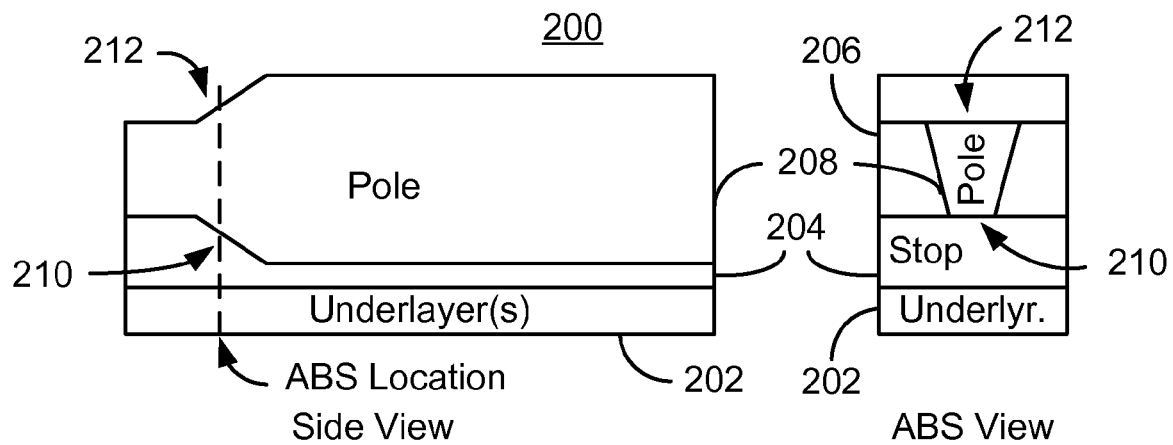
FIG. 4 is a diagram depicting an exemplary embodiment of a PMR transducer.

FIG. 4 is a diagram depicting an exemplary embodiment of a portion of a PMR transducer 200 that may be formed using the method 100. For clarity, FIG. 4 is not to scale. The PMR transducer 200 includes underlayer 202, stop layer 204, intermediate layer 206, and pole 208. The pole 208 includes leading edge bevel 210. In the embodiment shown, a trailing edge bevel 212 is also provided. However, in some embodiments, the trailing edge bevel 212 may be omitted. Also shown is the ABS location. For example, in some embodiments, the transducer 200 is lapped to expose the surface of the transducer 200 at the ABS location.

Using the method 100, a leading edge bevel 210 may be provided in a pole 208 formed in a trench in an intermediate layer 206. Further, the leading edge bevel 210 may be provided in a manner that allows the top surface of the intermediate layer to be flat during fabrication of the transducer 200. Thus, subsequent steps in the method 100, particularly photolithography performed in fabricating the pole 208, may be improved. The desired shape of the pole 208 may thus be easier to achieve. Consequently, performance of the pole 208 fabricated using the method 100 may be improved. This improvement might be achieved while utilizing existing process modules.

Figure 5:
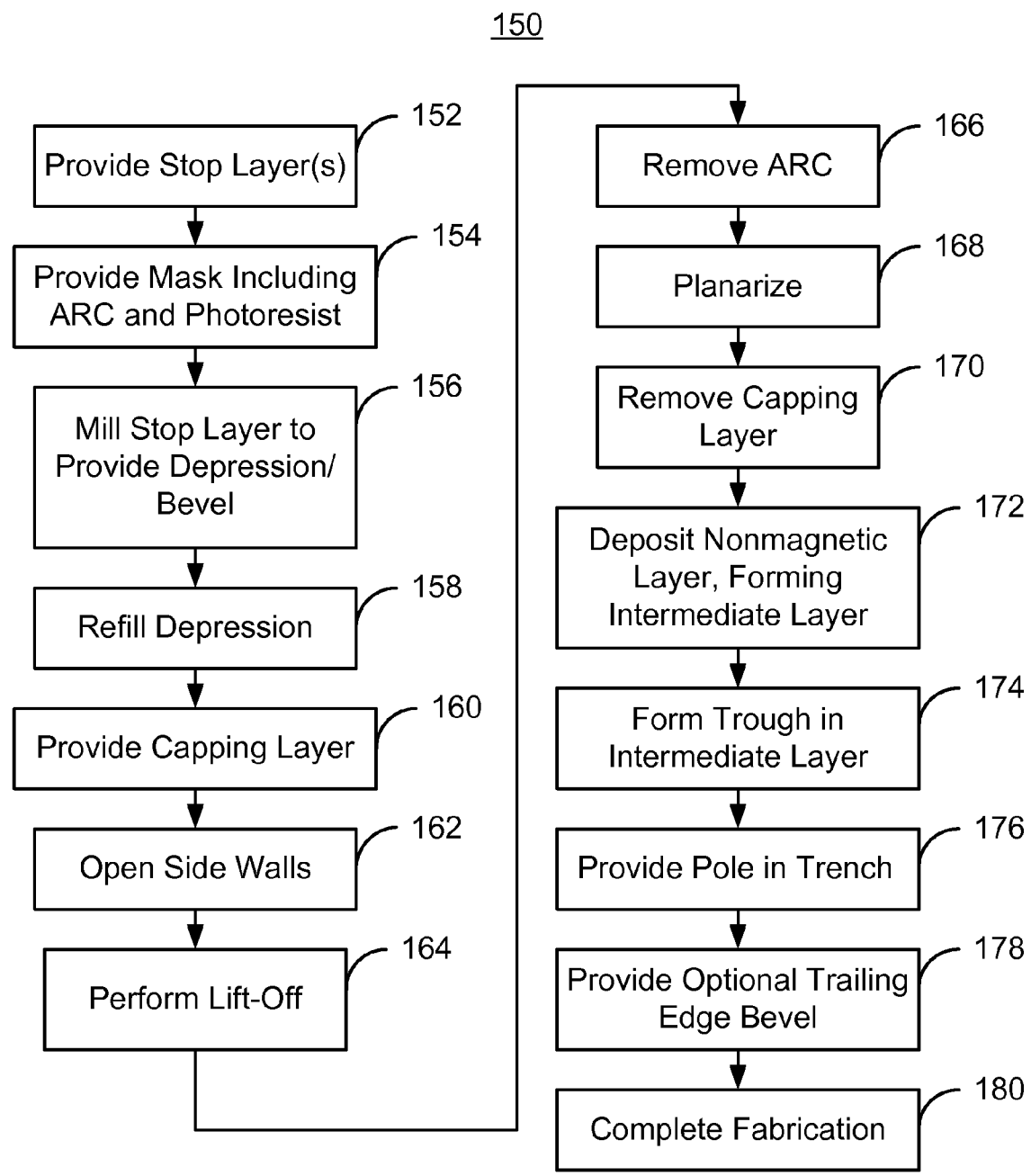
FIG. 5 is a flow chart depicting another exemplary embodiment of a method for fabricating a PMR transducer.
Figure 19:
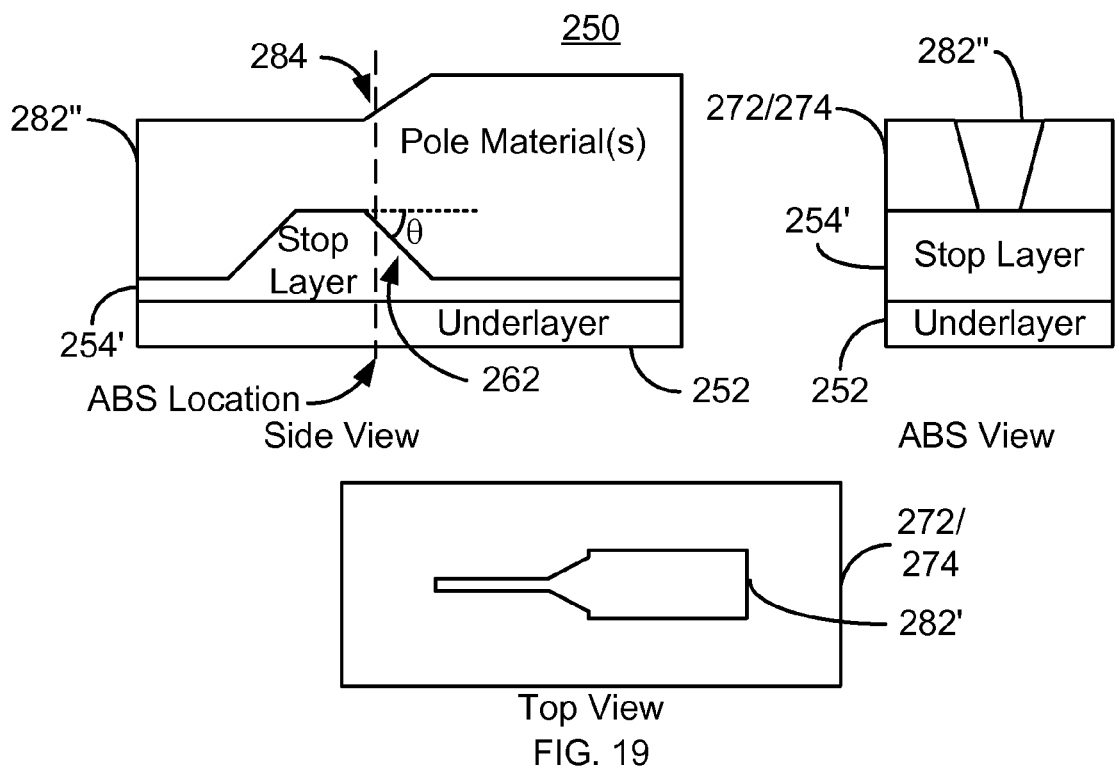
Figure 20:
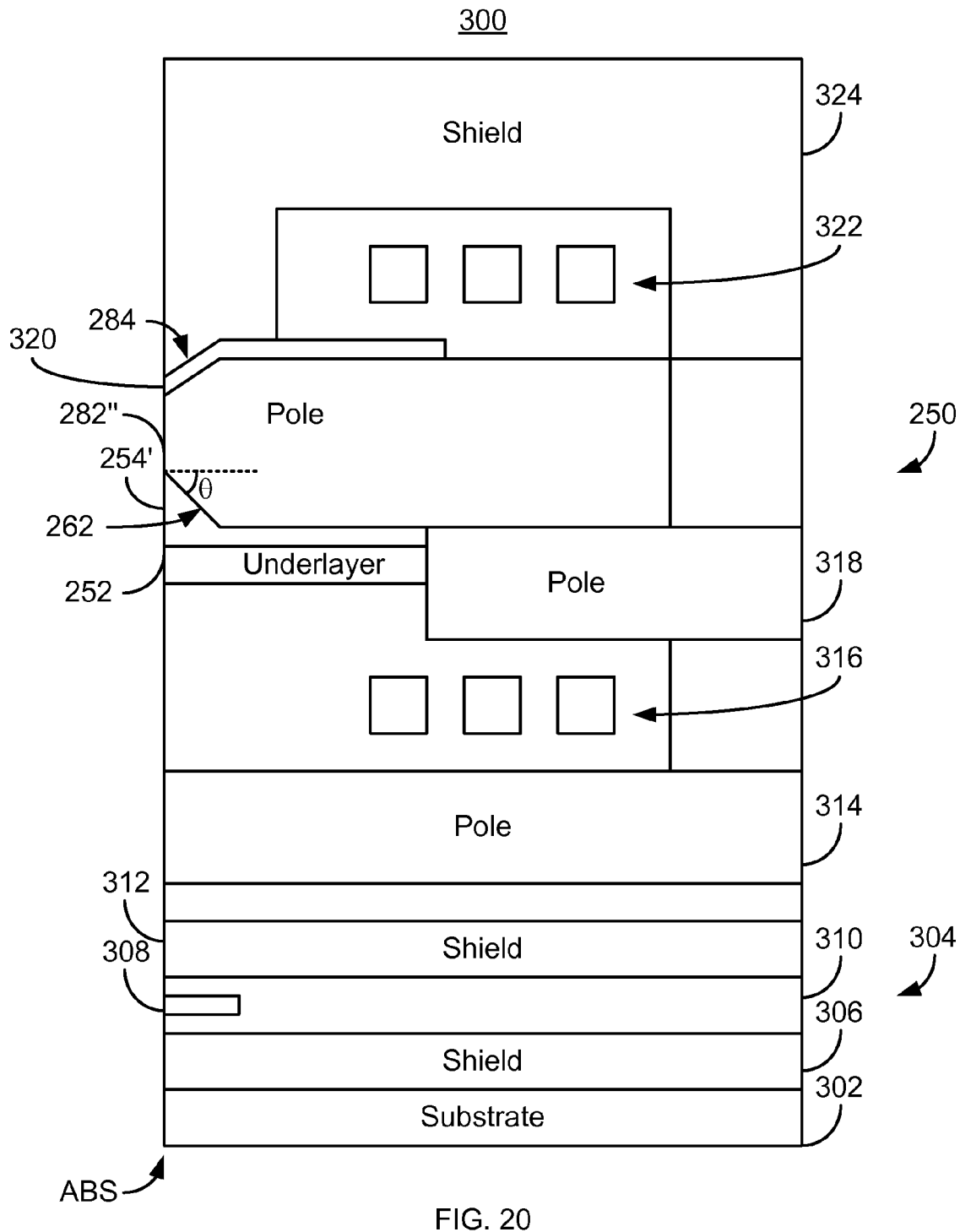

FIG. 5 is a flow chart depicting another exemplary embodiment of a method 150 for fabricating a PMR transducer. For simplicity, some steps may be omitted. FIGS. 6-19 are diagrams depicting side, ABS, and top views of an exemplary embodiment of a portion of a PMR transducer during 250 fabrication. FIG. 20 depicts a side view of a PMR head incorporating the PMR transducer 250. For clarity, FIGS. 6-20 are not to scale. Further, although FIGS. 6-20 depict the ABS location and ABS at a particular point in the pole, other embodiments may have other locations for the ABS. Referring to FIGS. 5-20, the method 150 is described in the context of the PMR transducer 200. However, the method 150 may be used to form another device (not shown). The PMR transducer 200 being fabricated may be part of a merged head 300 that also includes a read head (not shown in FIGS. 6-19) and resides on a slider (not shown) in a disk drive. The method 150 also may commence after formation of other portions of the PMR transducer 250. The method 150 is also described in the context of providing a single PMR transducer 250. However, the method 150 may be used to fabricate multiple transducers at substantially the same time. The method 150 and device 250 are also described in the context of particular layers. However, in some embodiments, such layers may include multiple sublayers.

In one embodiment, the method 150 commences after formation of the underlayer(s) on which the PMR pole. A stop layer is deposited on the underlayer, via step 152. In some embodiments, step 152 may include depositing a layer of Ru. However, in other embodiments, other materials, such as Cr, and NiFeCr might be used. Further, step 152 could include depositing a bilayer or another number of layers. For example, a layer of NiFe might be deposited, followed by a layer of Ru. The thickness of the stop layer provided in step 152 should be greater than the thickness of the bevel being deposited. For example, the bevel being fabricated may be desired to have a height of 1000 Angstroms. The stop layer for such an embodiment may be at least 1200 Angstroms thick. In some such embodiments, the stop layer is at least 1400 Angstroms and not more than 1600 Angstroms.

Figure 6:
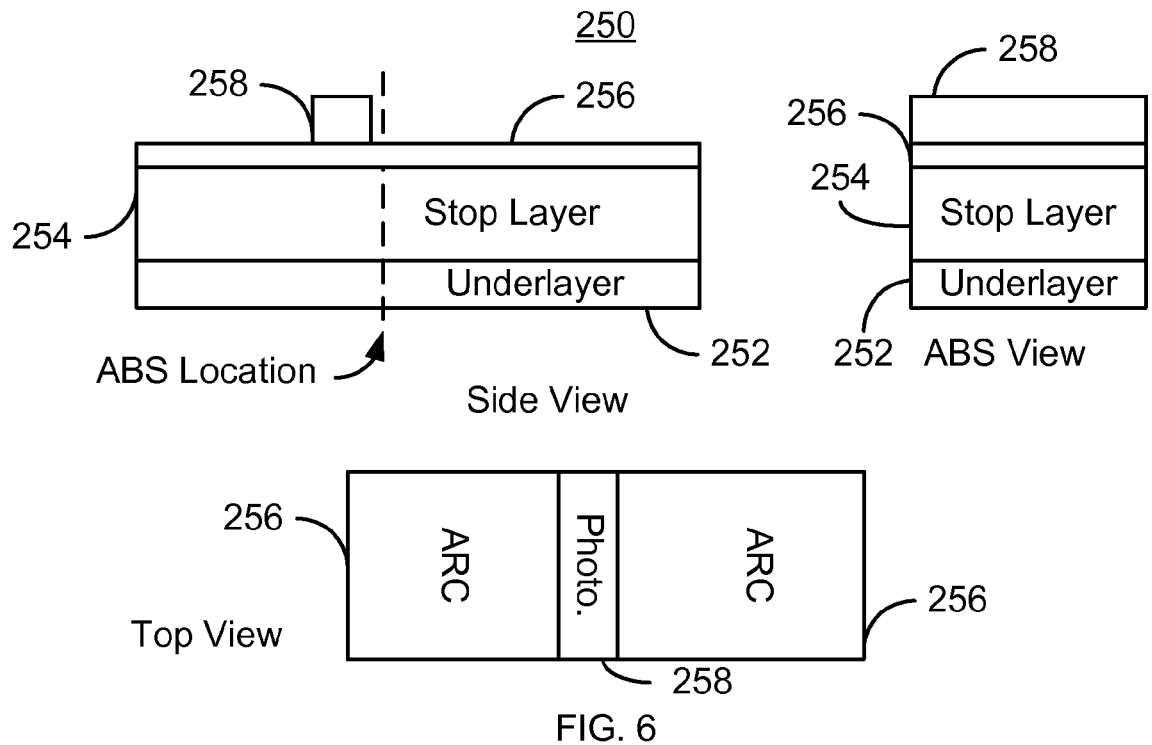
Figure 7:
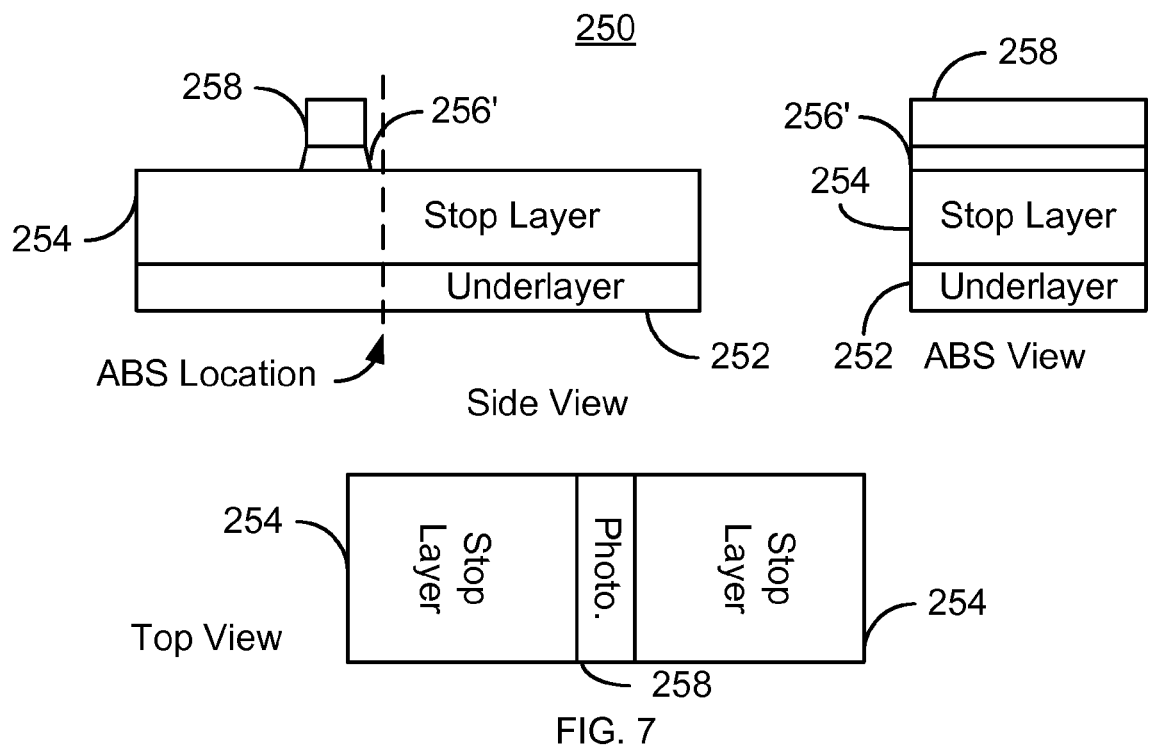

A mask covering a portion of the stop layer is provided, via step 154. The mask includes an antireflective coating (ARC) layer and a photoresist layer on the ARC layer. The mask covers a portion of the stop layer proximate to the ABS. FIG. 6 depicts the transducer 250 during step 154. Thus, an underlayer 252 and stop layer 254 are shown. In addition, the ARC layer 256 and photoresist layer 258 are shown. In the embodiment shown in FIG. 6, the pattern of the photoresist layer has not yet been transferred to the ARC layer 256, which may be on the order of six hundred Angstroms in thickness. FIG. 7 depicts the transducer 250 after step 154 is completed. Thus, the pattern of the photoresist layer 258 has been transferred to the ARC layer 256'. In some embodiments, the transfer of the pattern of the photoresist layer 258 to the ARC layer 256' is performed via an ion mill which also forms the bevel in step 156, described below.

An exposed portion of the stop layer is milled at a mill angle to form a depression therein, via step 156. The depression forms a bevel in the Ru layer. The mill angle selected for step 156 depends upon the desired angle for the bevel. FIG. 8 depicts the transducer 250 after step 156 is performed. Thus, a depression 260 forming a bevel 262 is formed in the stop layer 254'. The depression 260, and thus the bevel 262, each has a depth less than the thickness of the stop layer. For example, in some embodiments the stop layer 254' is at least 1200 Angstroms, and more generally 1400-1600 Angstroms thick. The bevel 262 in such an embodiment may be not more than 1000 Angstroms deep. The bevel 262 forms a bevel angle, $\theta$, with respect to a remaining portion of the top surface of the stop layer. The bevel angle is greater than zero degrees and less than ninety degrees. In some embodiments, the bevel angle is at least twenty degrees and not more than forty degrees. Also shown is the mill angle, $\phi$, that corresponds to the bevel angle, $\theta$. As can be seen in FIG. 8, in addition to being less than ninety degrees, the bevel angle is less than the mill angle.

The depression 260 is then refilled with a nonmagnetic refill material, via step 158. For example, step 158 may include depositing alumina. The thickness of the refill materials is substantially equal to the depth of the bevel 262. In some embodiments, step 158 is performed using ion beam deposition. As a result, the top surface of the refill material may be made very flat. The ion beam deposition is also carried out at a deposition angle that corresponds to the bevel angle. In some embodiments, the deposition angle is greater than the bevel angle. Such a deposition may result in the top surface of the refill material being substantially coplanar with the top portion of the stop layer. However, in other embodiments, the refill material may be deposited in another manner that provides substantially the same relationship between the top surfaces of the refill materials and the stop layer 254'.

A capping layer is provided on the refill material, via step 160. In some embodiments, the capping layer includes Ta and is provided to assist in subsequent lift-off of the photoresist layer 258. FIG. 9 depicts the transducer 250 after step 160 is performed. Thus, the refill material 264 has been provided using ion beam deposition. Also shown in FIG. 9 is the deposition angle, $\alpha$, for the refill material. The deposition angle corresponds to and is generally desired to be larger than the bevel angle. The capping layer 266 is also shown. As can be seen in FIG. 9, the top of the refill material is substantially coplanar with the top of the remaining portion of the stop layer 254', residing under the ARC layer 256'.

Figure 10:
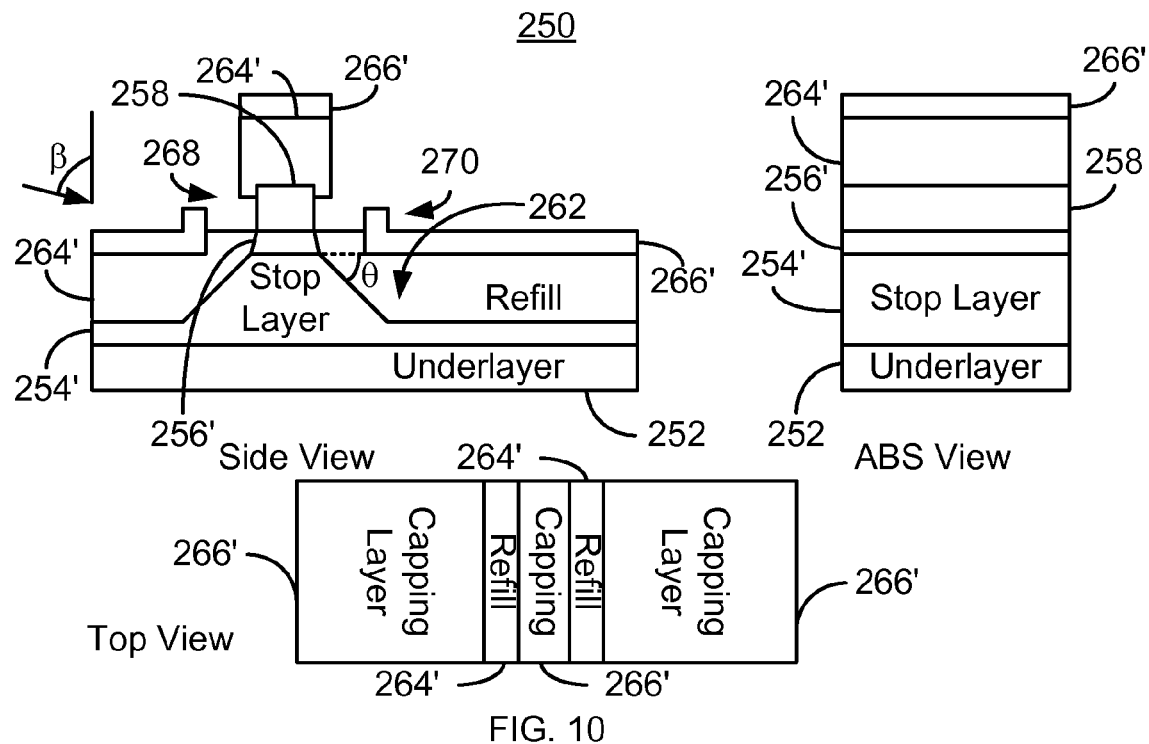

An opening in the capping layer and refill material residing on the sidewalls of the mask layers 266 and 268 is formed, via step 162. In one embodiment, step 164 is performed using a high angle ion mill. For example, the milling may be performed at not less than seventy degrees and not more than eighty degrees from normal to the surface of the capping layer 266. FIG. 10 depicts the transducer 250 after step 162 is performed. For clarity, the depression 260 is no longer separately labeled. Also shown is a milling angle, $\beta$. An opening 268 in the capping layer 266' and the refill layer 264' has been formed. The opening 268 exposes the photoresist layer 258'. Fencing 270 of the capping layer 266' is also formed.

Figure 11:
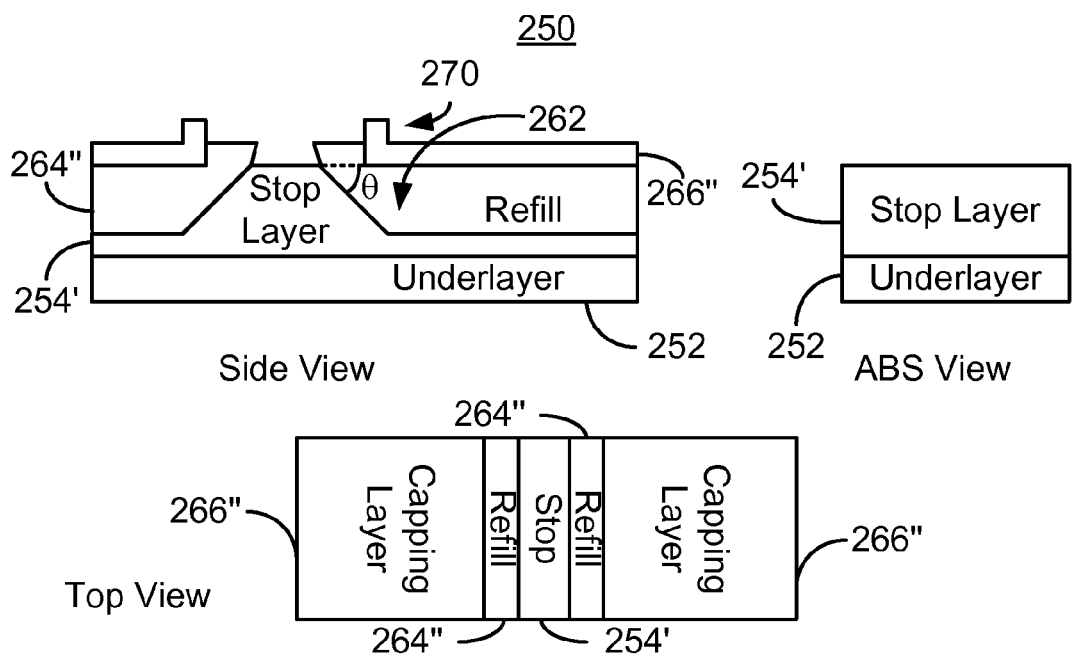

A lift-off of the photoresist layer 258 is performed, via step 164. Because the opening 268 is present, solutions used in the lift-off may reach the photoresist layer. Thus, the photoresist layer 258 may be removed. In addition, the ARC layer 256 is removed, via step 166. In some embodiments, an RIE configured to remove the ARC layer 256 is performed. Thus, the mask is removed through steps 162, 164, and 166. FIG. 11 depicts the transducer 250 after step 166 is completed. Thus, the mask layers 256 and 258 have been removed. A portion of the refill material 264" and capping layer 266" remain.

Figure 12:
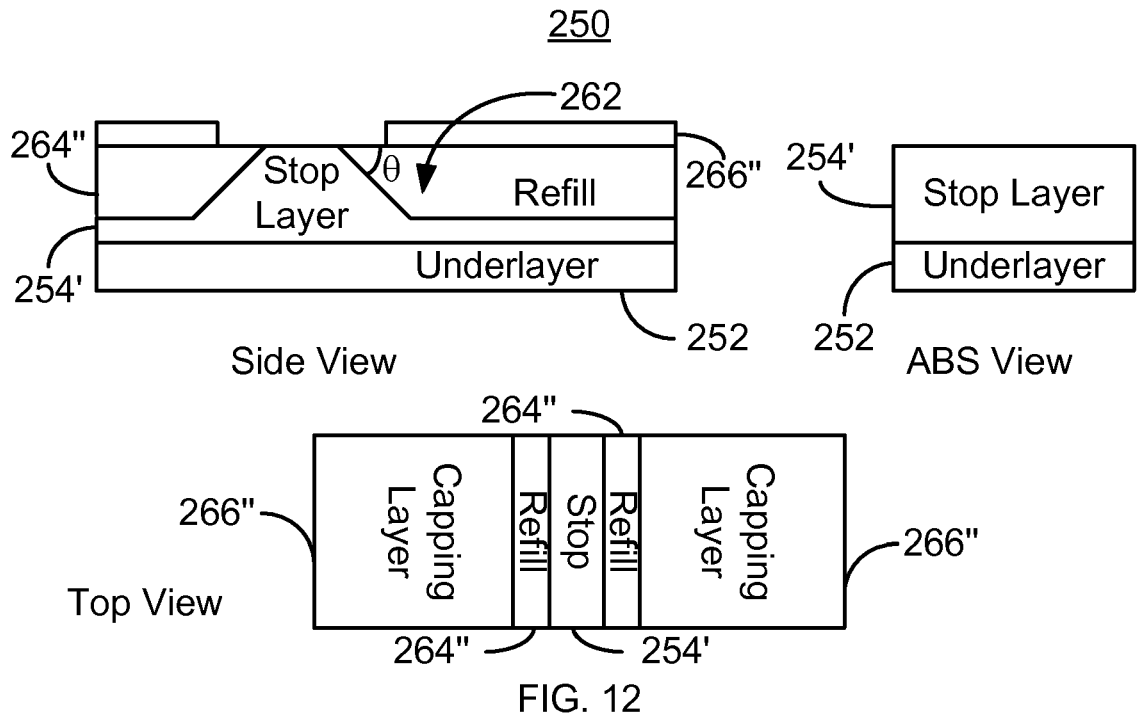

The transducer 250 is planarized after the mask is removed, via step 168. In some embodiments, the step 168 includes performing a CMP. FIG. 12 depicts the transducer 250 after step 168 is performed. Thus, fencing 270 has been removed from the capping layer 266". A portion of the refill material 264" as well as another portion of the capping layer 266" may also be removed.

Figure 13:
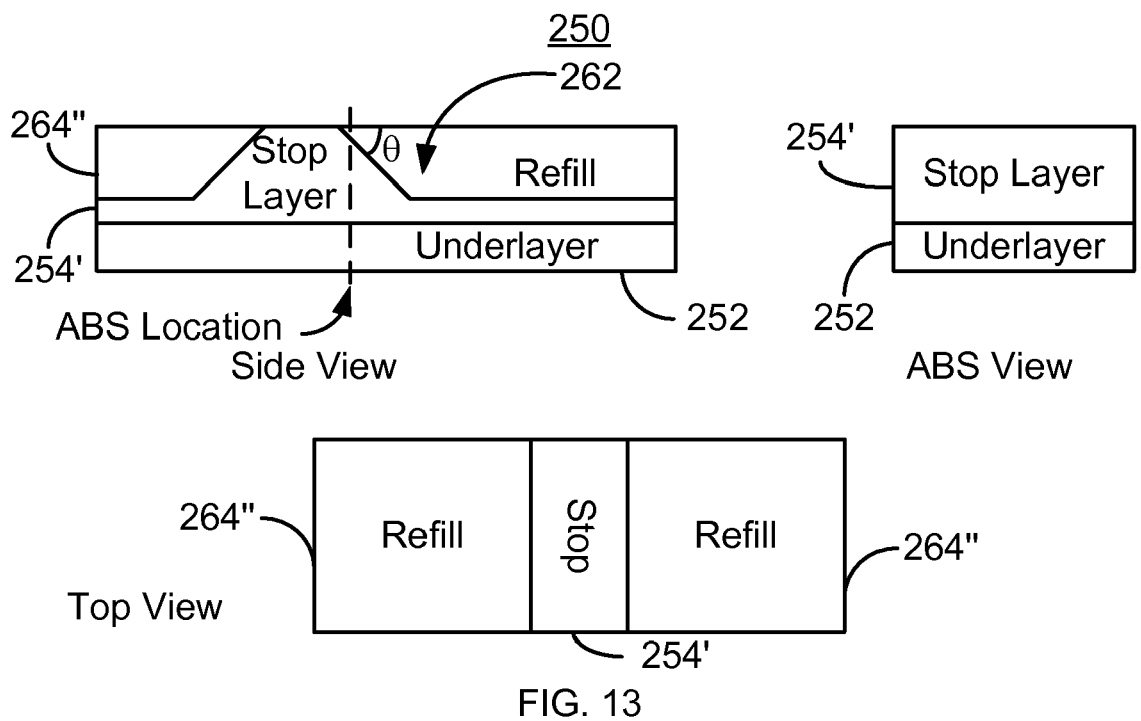

The capping layer 264" is removed, via step 170. In some embodiments, step 170 includes performing an RIE. FIG. 13 depicts the transducer 250 after step 170 has been performed. Thus, the flat upper surface of the refill material 264" is exposed. As can be seen in FIG. 13, the upper surface of the refill material 264" is substantially coplanar with the top surface of the stop layer 254' near the ABS location and outside of the bevel 262. Consequently, a substantially flat surface is provided for subsequent processing. As a result, processing of the pole is facilitated.

Figure 14:
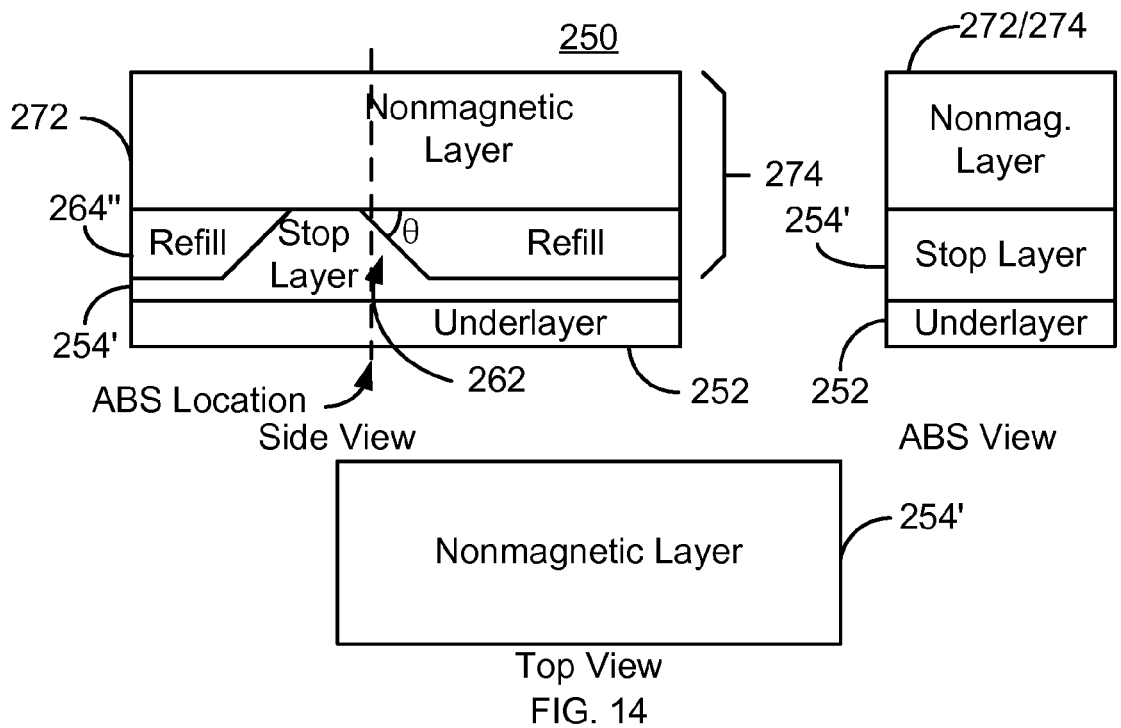

A nonmagnetic layer is provided on the refill material, via step 172. In some embodiments, the nonmagnetic layer and the refill material 264" have substantially the same composition. For example, both the refill material 264" and the nonmagnetic layer may be alumina. FIG. 14 depicts the transducer 250 after step 172 is performed. Thus, a nonmagnetic layer 272 on the refill material 264" and stop layer 254' is shown. Together, the layers 264" and 272 form an intermediate layer 274. Because it is deposited on the flat surface of the combination of the refill material 264" and stop layer 254', the nonmagnetic layer 272 also has a flat top surface. Thus, the intermediate layer 274 also has a substantially flat layer top surface and a thickness that corresponds to the sum of the thicknesses of the layers 264" and 272.

Figure 15:
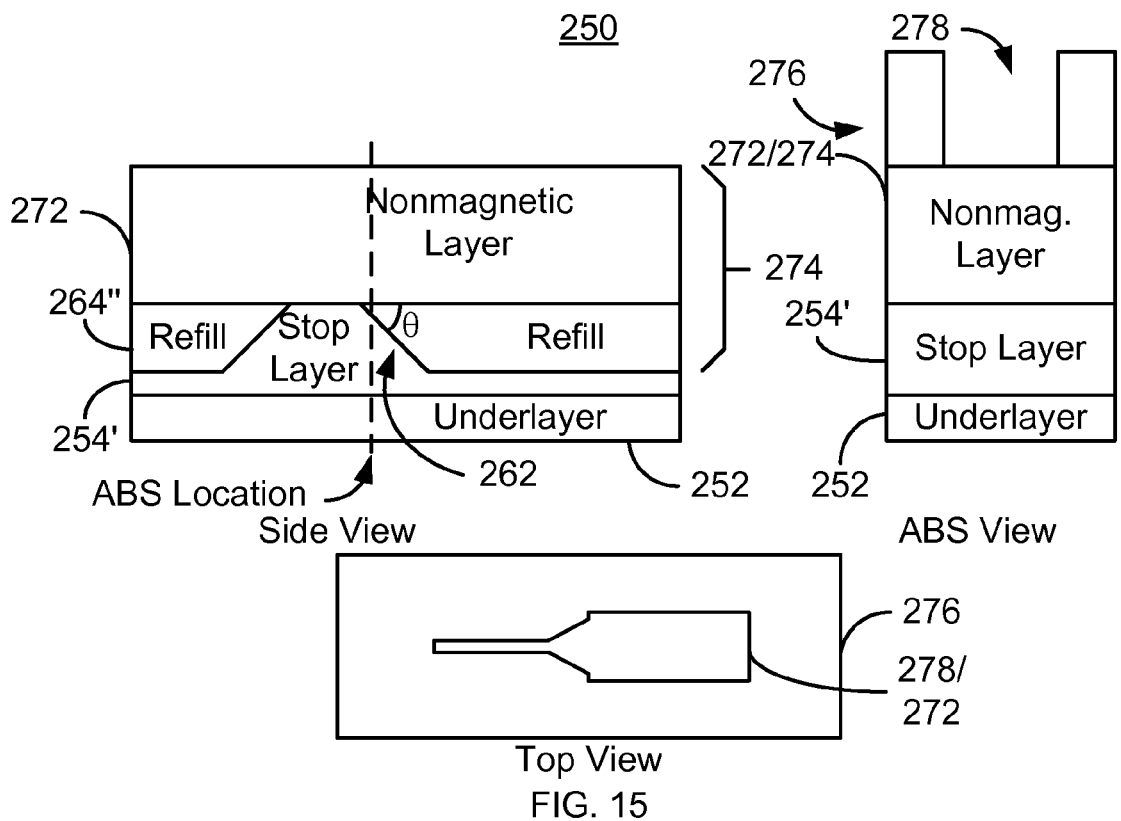
Figure 16:
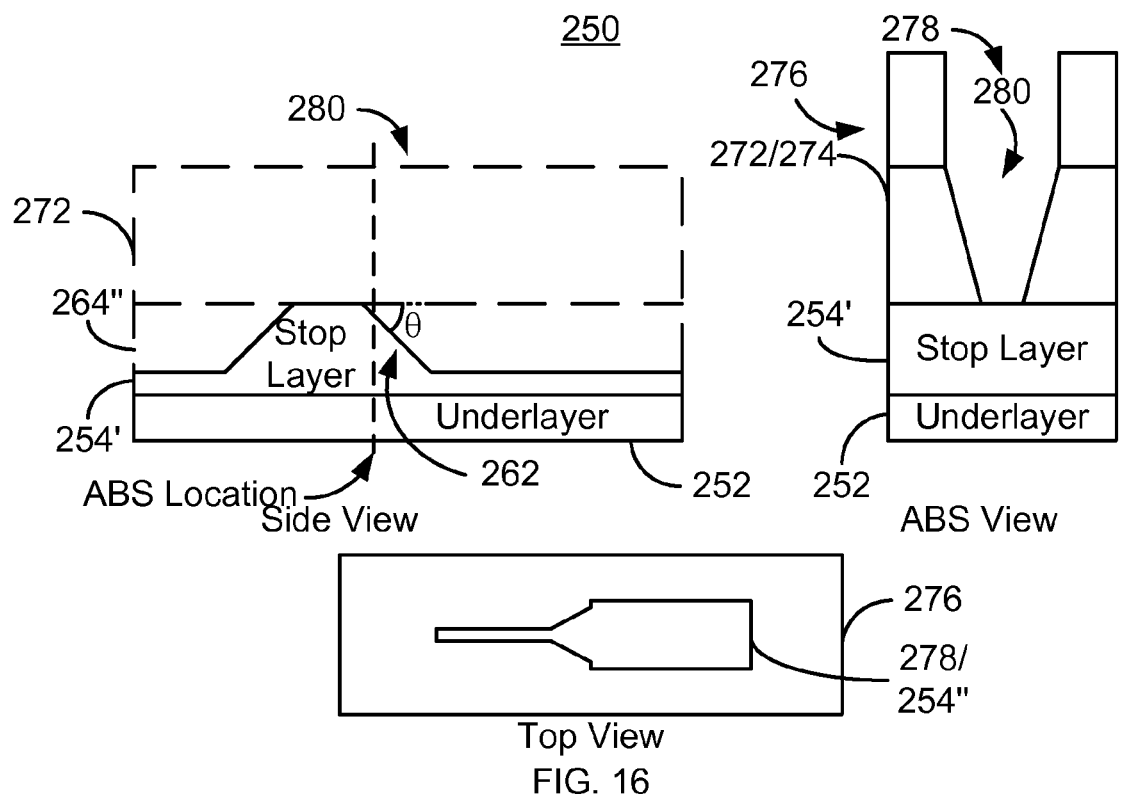

A trench is then formed in the intermediate layer 274, via step 174. Step 174 includes providing a mask having an aperture therein. The aperture corresponds to the location and footprint of the trench. FIG. 15 depicts the transducer 250 after such a mask 276 has been provided. The aperture 278 exposes a portion of the nonmagnetic layer 272/intermediate layer 274. Note that the mask 276 is not shown in the side view because the aperture 278 resides above the portion of the transducer 250 shown in the side view. A portion of the intermediate layer 274 exposed by the aperture is removed in step 174, for example by an RIE. Thus, parts of both the nonmagnetic layer 272 and the refill material 264" are removed. The removal process may continue until it terminates in the stop layer 254'. The stop layer 254' is thus a stop for the removal process used in step 174. FIG. 16 depicts the transducer 250 after step 174 is completed. Thus, a trench 280 is formed in the intermediate layer 274. Because the trench 280 is formed in the region shown in the side view of FIG. 16, the intermediate layer 274, refill material 264", and nonmagnetic layer 272 are shown in the side view by dashed lines. In the embodiment shown, the stop layer 254' forms the bottom of the trench 280. The trench 280 has a profile and location corresponding to the pole to be formed. Thus, the top of the trench 280 is wider than the bottom. In addition, the bottom of the trench 280 includes the bevel 262 in the stop layer 254".

Figure 17:
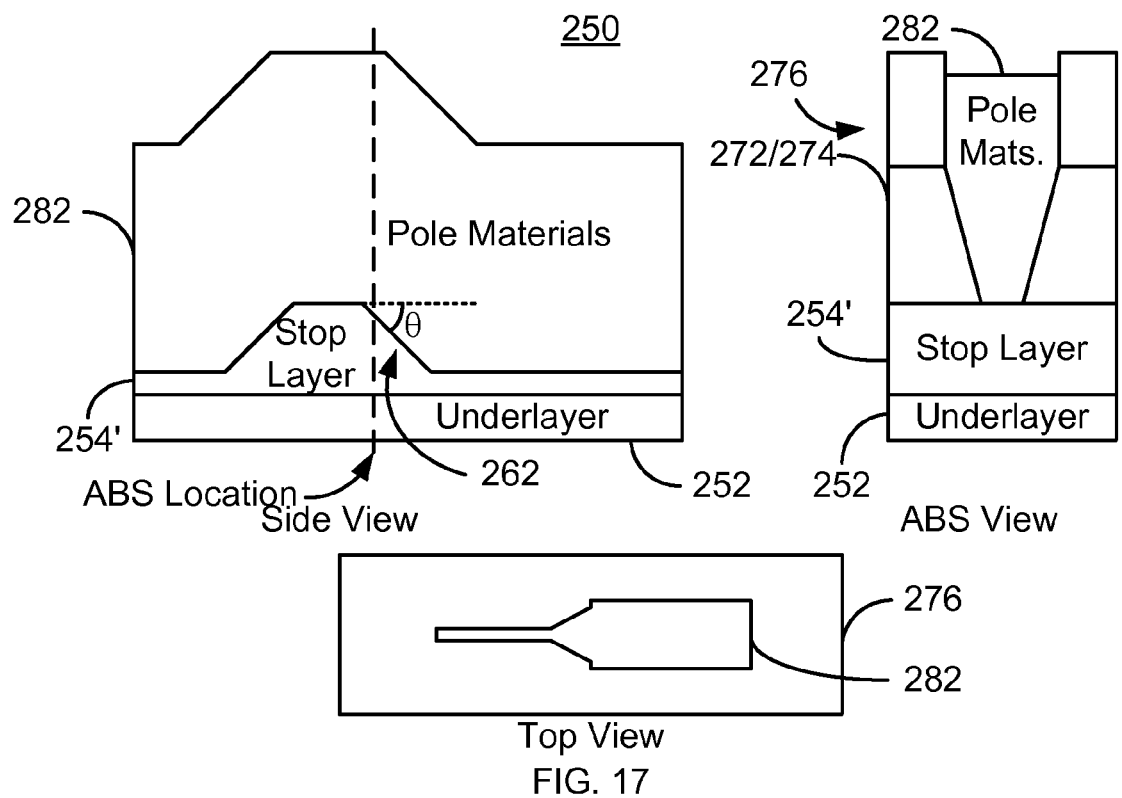
Figure 18:
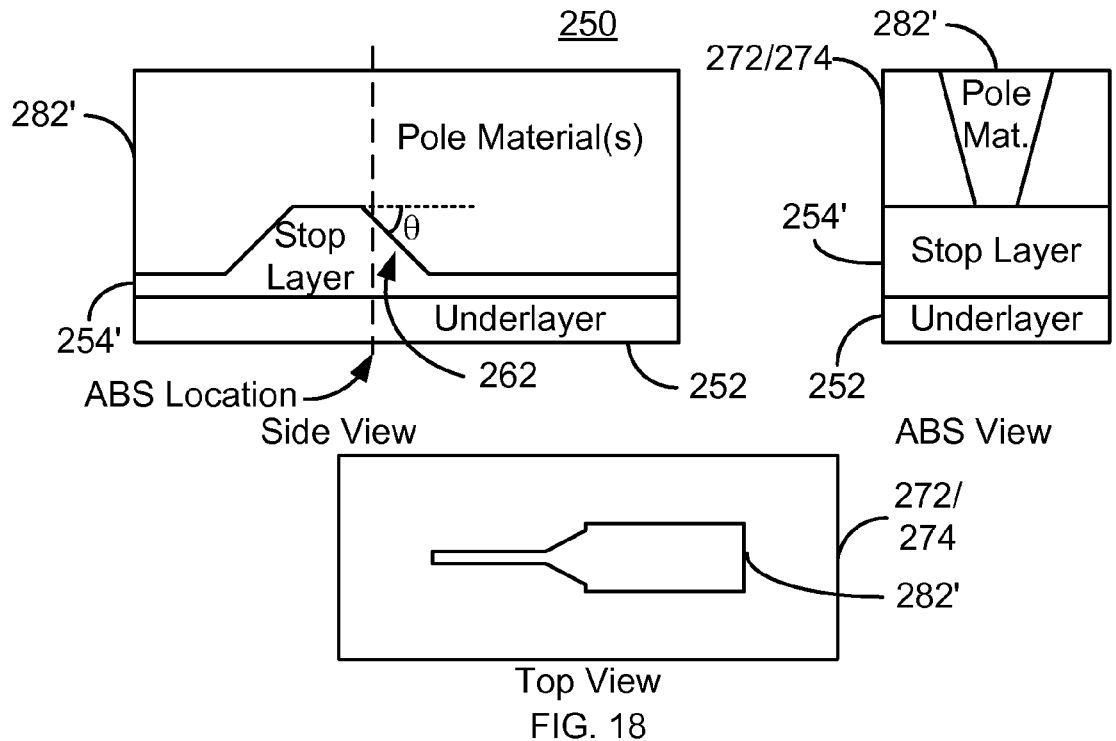

A pole is provided in the trench 280, via step 176. Step 176 includes depositing the pole materials, for example using one or more of sputtering and plating seed and/or other materials for the pole. FIG. 17 depicts the transducer 250 after the pole material(s) 282 have been deposited in step 176. For clarity, the trench 280 and aperture 278 are not labeled in FIG. 17. In addition, in some embodiments, the mask 278 may be stripped and a planarization, such as a CMP, performed on the transducer 250. FIG. 18 depicts the transducer 250 after step 176 is completed. Thus, pole materials 282' having a leading edge bevel 262 corresponding to the bevel 262 in the stop layer 254' is formed.

A trailing edge bevel may optionally be formed, via step 178. In some embodiments, step 178 includes providing a mask having an aperture proximate to the ABS location. An ion mill may then be used to remove a portion of the pole material(s) 282' exposed by the aperture in the mask. The mask may then be stripped. FIG. 19 depicts the transducer 20 after step 178 is performed. Thus, the pole 282" includes a bevel 284.

Fabrication of the transducer may be completed, via step 180. Step 180 may include fabricating other structures such as side and trailing edge shields, a write gap, and other features. In addition, step 180 may include removing portions of the device shown, such that the ABS is exposed at the ABS location. FIG. 20 depicts a side view of one embodiment of a PMR head 300 including a PMR transducer 250. FIG. 20 is not to scale. In addition, different and/or other components may be included in other embodiments. The head 300 includes the PMR transducer 250 and a read transducer 304 on a substrate 302. The read transducer 304 includes shields 306 and 312 and read sensor 308. In addition to the pole 282", stop layer 254', and underlayer 252, the transducer 250 is also shown as includes poles 314 and 318, coils 316 and 322, write gap 320, and shield 324. Although not shown, leading and/or side shields may also be provided in the transducer 200.

Thus, using the method 150, the PMR transducer 250, and the head 300, may be formed. More specifically, pole 282" having a leading edge bevel 262, was well as an optional trailing edge bevel 284, may be manufactured. Because the method 150 forms the intermediate layer 274 such that its top surface is flat, photolithography and other processes used in forming the trench 280 and the pole 282" may be facilitated. Thus, the pole 282" may be closer to the desired shape and its performance improved. Using the method 150, therefore, the transducer 250 and head 300 having improved performance may be fabricated.

We claim:

1. A method for fabricating a pole of a magnetic transducer, the method comprising:
   providing a stop layer having a thickness and a top surface, the stop layer being nonmagnetic;
   removing a portion of the stop layer to form a depression therein, the depression forming a bevel in the stop layer, the bevel having a depth less than the thickness, the bevel having a bevel angle with respect to a remaining portion of the top surface, the bevel angle being greater than zero degrees and less than ninety degrees;
   providing an intermediate layer over the stop layer, the intermediate layer having a substantially flat top surface;
   removing a portion of the intermediate layer via a removal process to form a trench therein, the trench having a profile corresponding to the pole, the stop layer being a stop for the removal process; and
   providing the pole in the trench, the pole having a leading edge bevel corresponding to the bevel in the stop layer.

2. The method of claim 1 wherein the step of providing the intermediate layer further includes:
   providing a refill material, the refill material being nonmagnetic and having a top surface substantially coplanar with the remaining portion of the stop layer, the stop layer being a stop layer for a removal process for the refill material; and
   providing a nonmagnetic layer on the refill material, the nonmagnetic layer having the substantially flat top surface.

3. The method of claim 2 wherein the step of removing the portion of the stop layer further includes:
   providing a mask covering an additional portion of the stop layer; and
   milling the portion of the stop layer at a mill angle corresponding to the bevel angle.

4. The method of claim 3 wherein the step of providing the refill material further includes:
   refilling the depression with the refill material;
   providing a capping layer on the refill material;
   planarizing at least the capping layer; and
   removing the capping layer.

5. The method of claim 4 further comprising:
   removing the mask after the capping layer is provided and before the step of planarizing the magnetic transducer.

6. The method of claim 5 wherein the mask includes a plurality of sidewalls and wherein the step of removing the mask further includes:
   removing a portion of the capping layer on the sidewalls; and
   performing a lift-off.

7. The method of claim 6 wherein the mask includes an antireflective coating (ARC) layer and a photoresist layer on the ARC layer, the lift-off removing the photoresist layer, the step of removing the mask further including:
   reactive ion etching the ARC layer.

8. The method of claim 3 wherein the mill angle is greater than the bevel angle.

9. The method of claim 1 wherein the depth is at least one thousand Angstroms.

10. The method of claim 1 wherein the bevel angle is at least twenty degrees and not more than forty degrees.

11. The method of claim 1 wherein the stop layer includes at least one of Ru, Cr, NiCr, and NiFe.

12. The method of claim 11 wherein the stop layer includes NiFe and wherein the method further includes:
    providing a Ru layer after the step of removing the portion of the stop layer and before providing the intermediate layer.

13. The method of claim 1 wherein the thickness of the stop layer is at least 1200 Angstroms.

14. The method of claim 13 wherein the thickness of the stop layer is at least 1400 Angstroms and not more than 1600 Angstroms.

15. The method of claim 1 wherein the pole has a bottom and a top wider than the bottom.

16. The method of claim 1 further comprising:
    forming a trailing bevel in the pole.

17. The method of claim 16 wherein the step of forming the trailing bevel further includes:
    masking a portion of the pole distal from an air-bearing surface location; and
    milling an exposed portion of the pole.

18. The method of claim 1 wherein the trench has a bottom formed by a portion of the stop layer.

19. A method for fabricating a pole of a magnetic transducer, the method comprising:
    providing a Ru layer having a thickness and a top surface;
    providing a mask covering a portion of the Ru layer, the mask including an antireflective coating (ARC) layer and a photoresist layer on the ARC layer;
    milling an exposed portion of the Ru layer at a mill angle to form a depression therein, the depression forming a bevel in the Ru layer, the bevel having a depth less than the thickness, the bevel having a bevel angle with respect to a remaining portion of the top surface, the bevel angle being greater than zero degrees, less than ninety degrees, and less than the mill angle;
    refilling the depression with a refill material, the refill material being nonmagnetic and having a refill material thickness substantially equal to the depth;
    providing a capping layer on the refill material;
    removing the mask after the capping layer is provided, the step of removing the mask including performing a lift-off of the photoresist layer and reactive ion etching the ARC layer;
    planarizing at least the capping layer after the mask is removed;
    removing the capping layer, thereby exposing a substantially flat refill material top surface;
    depositing a nonmagnetic layer on the refill material, the nonmagnetic layer and the refill material having substantially the same composition, the nonmagnetic layer having a substantially flat nonmagnetic layer top surface;
    removing a portion of the nonmagnetic layer and a portion of the refill material to form a trench in the nonmagnetic layer and the refill material, the trench having a profile corresponding to the pole and a bottom on a portion of the Ru layer; and
    providing the pole in the trench, the pole having a leading edge bevel corresponding to the bevel in the Ru layer.

* * * * *